United States Patent [19]

Botello

[11] 4,005,601
[45] Feb. 1, 1977

[54] APPARATUS FOR DETECTING RAIL DISCONTINUITIES

[75] Inventor: Ramon J. Botello, Annandale, Va.

[73] Assignee: AMAC, Inc., Springfield, Va.

[22] Filed: Aug. 29, 1975

[21] Appl. No.: 609,090

[52] U.S. Cl. .................................. 73/146; 33/144
[51] Int. Cl.² ........................................ B61K 9/08
[58] Field of Search ............... 73/146, 67.7, 67.8 S, 73/67.9; 33/144, 146; 324/37 R

[56] References Cited

UNITED STATES PATENTS

| | | | |
|---|---|---|---|
| 3,517,307 | 6/1970 | Wallen, Jr. et al. | 33/144 |
| 3,718,040 | 2/1973 | Freeman et al. | 73/146 |
| 3,906,789 | 9/1975 | Bingmann | 73/146 |
| 3,924,461 | 12/1975 | Stover | 73/146 |

*Primary Examiner*—Donald O. Woodiel
*Attorney, Agent, or Firm*—Morris Liss

[57] ABSTRACT

Apparatus and technique for use on a moving rail vehicle to detect, measure and record rail surface and side discontinuity by means of sensors mounted at intervals on the rail vehicle undercarriage. The sensors may be of the contact or non-contact variety, continually sensing track conditions. The sensor signals are transmitted to a peak detection system which evaluates the signals against prior values standarized for optimum track conditions. The system further determines peak values to indicate rail discontinuities. Analyzing, recording, and storing the signals are done with the aid of a computer processing unit and a magnetic tape unit as the storage medium.

2 Claims, 9 Drawing Figures

APPARATUS FOR DETECTING RAIL DISCONTINUITIES

BACKGROUND OF THE INVENTION

The present invention relates generally to apparatus for detecting and surveying the character of a roadbed including the surface on which vehicular traffic passes, such a railway tracks or specially implemented roadways with respect to factors such as rail discontinuities. More specifically, the invention relates to the measurement and detection of rail opening/separation conditions, rail-end mismatch conditions and rail-end batter conditions.

American railroad trains are able to operate over all rail lines in the United States, Canada and Mexico. This is made possible by uniformity of physical dimensions of railroad tracks, switching and control circuits and uniformity of railroad operating rules from railroad to railroad. The uniformity of physical dimensions includes the track dimensions of gage, elevation, surface, alignment, curvature, warp and runoff as well as rail-end mismatch of rail section to rail section, rail-end batter and steel rail. Standards have been established and adopted by the railroads themselves, the Association of American Railroads and the Federal Railroad Administration for the safety of people and rail cars operating over railroad lines.

In the past, a variety of types of apparatus have been proposed for use in determining the profile, alignment, elevation, track gage, curvature, and other parameters or geometry characteristics of a railway track. This is necessary to provide information to a central authority, such as a traffic safety group, for determining points at which rail conditions or track conditions are faulty, require correction and/or for ascertaining the quality of the ride to be expected by passengers on the vehicle.

Currently, one method of track inspection is performed by track inspectors walking along the track or riding at slow speed in a high-rail vehicle. Such structural flaw or discontinuity inspection allows for only one area of detection to be accomplished. That is, track inspection performed in this manner provides a limited amount of data, excluding such information as concerning loaded geometry measurements. This type of inspection reveals some problems such as openings and separations in the rail, rail-end mismatch, and rail-end batter conditions through either the mechanical apparatus or the inspector's careful observations. However, this method has proven to be slow and inefficient for inspection of many miles of track which must be kept in repair to meet safety standards.

Special vehicles have been built capable of measuring track geometry at speeds up to 50 miles per hour using mechanical feelers. See U.S. Pat. No. 3,056,209 to Oliver et al, entitled "Method and Apparatus for Measuring Surface Contours". Other systems operate at speeds up to 150 miles per hour using non-contact electronic sensors (capacitive, magnetic/servo magnetic, photo-optical and laser beam). An example of a capacitive configuration is disclosed in U.S. Pat. No. 3,500,186 to Hronik et al, entitled "Apparatus for High Speed Measurement of Track Geometry".

Apparatus for measuring track geometry, moving at such high speed, has not been able to detect many of the individual rail flaws and discontinuities found by the slower moving vehicle or person employed for that purpose. Apparatus is necessary for receiving a more complete set of data and maintaining safe track conditions. The emphasis on high speed mass transit systems using high speed rail vehicles demands the use of greater speeds in track geometry measurement vehicles to approach actual transportation situations. Such apparatus answering this demand has been disclosed in U.S. Pat. Nos. 3,500,186 and 3,517,307.

The neglected area of consideration in the prior art systems resides in the method of data collection and analysis. Measurement samples taken by the methods of previously described prior art apparatus are recorded only at that point where the signals are sampled. This fails to record any sudden changes in track geometry or rail discontinuity occurring between the sample intervals.

The electrical signals generated by electronic sensor and/or mechanical feeler systems are converted to an electrical analog of each track geometry measurement of interest for the railroad maintenance engineer, and the resultant signal is recorded on a pen and ink recorder for visual analysis. The railroad maintenance engineer studies the recording and decides when a measurement exceeds a safe limit. He manually marks the recording and notes the location of the exception.

More sophisticated prior art systems sample the analog signals at periodic intervals of from 6 inches to several feet then convert these samples to an equivalent digital number and record the sample on digital tape for further analysis after the test run is complete. Highly sophisticated automated systems are capable of processing each sample as it is taken and comparing each sample against preset thresholds to determine if a measurement exceeds a safe limit. A printed message immediately alerts the railroad maintenance engineer of a track condition that needs repair. Systems that digitally sample the analog signals at periodic distances along the track record the measurement of the track only at the point where the sample is taken. Since the point where the measurement sample is taken covers effectively only a small fraction of one inch, and the sampling interval is relatively large (every six inches to several feet), it can be seen that sudden changes in track geometry measurements that occur over short distances (less than the sample interval) can be entirely missed.

Three case conditions can be depicted, as an opening or separation in a track, rail-end mismatch in gage or surface, or a rail-end batter, which might exist and never would be detected and recorded because digital samples were taken on each side of the discontinuity condition. This can obviously be an extremely dangerous oversight.

Accordingly, it is the principal object of this present invention to provide an improved technique for measuring and detecting and recording discontinuities in rail and track conditions.

SUMMARY OF THE INVENTION

In accordance with the present invention, several techniques and apparatus are provided to obtain measurements relating to the detection of rail discontinuities such as rail openings or separations, rail-end mismatch in gage and in surface, and rail-end batter, in a manner such that no portion or section of the rail will be overlooked and go unmeasured. In accordance with the present invention, an apparatus senses the surface contours of the rail on the top and side of the rail head. This is accomplished in the described embodiments by means of a contact sensor, similar to one disclosed in U.S. Pat. No. 3,056,209, although other types of sensors such as electro-magnetic/servo-magnetic, capacitive, photo-optical or laser beam may be employed. The output signal from the sensor is a continuous measurement of the surface conditions of the rail head as the rail vehicle moves over the track. Should a rail discontinuity, such as those previously described, occur, the output signal from the sensor changes very rapidly. This rapid change in signal may be detected and measured by a peak detector, which evaluates the signal against prior values standardized for optimum conditions. The maximum value determined by the peak detector within a sample period is held temporarily in a sample and hold circuit, then transferred to a digital processor for analysis and then recorded on magnetic tape. The peak detector device is reset at the end of each sample period to resume its tracking measurements at the starting value for optimum conditions.

The sample and holding process is triggered in synchronization with the transfer of data to the digital processor and the reset signal to the peak detector. This results in a value sent to the processor at the end of each periodic sample.

No portion of the rail will be unmeasured with the techniques set foth by the present invention. As a discontinuity in the rail occurs, the output signal of the sensor changes very rapidly and this change is detected, located and identified as a dangerous condition which must be repaired.

BRIEF DESCRIPTION OF THE DRAWINGS

The invention is explained in greater detail in accordance with the accompanying drawings in which.

DETAILED DESCRIPTION OF THE INVENTION

Figure 1:
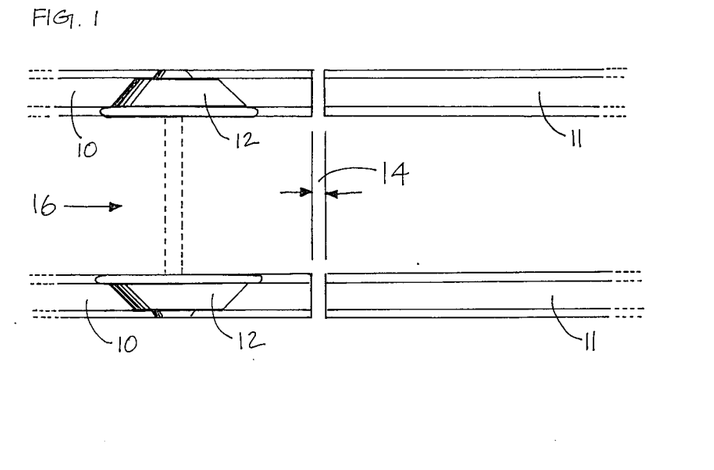
FIG. 1 is a top plan view of a rail separation condition.
Figure 2:
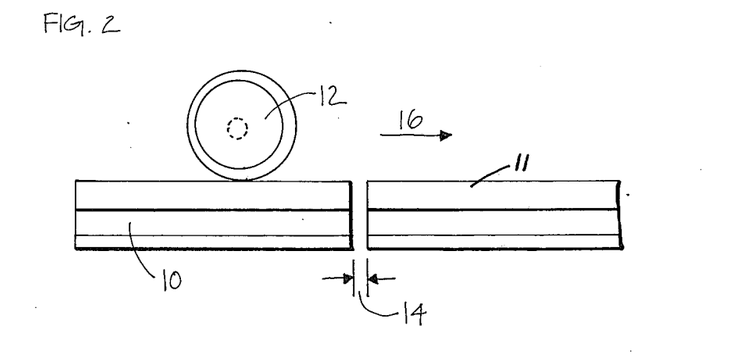
FIG. 2 is a side elevation view of the rail separation condition of FIG. 1.

Referring now to the drawings and, more specifically to FIG. 1, there is shown a section of rail in plan view, having respective rails 10 spaced normally apart over which rail car wheels 12 must travel in direction 16. The division 14 in the abutting rail joint illustrates a faulty condition known as a rail opening or separation. FIG. 2 is a side elevation view of rail 10, again illustrating the wheel 12 in movement over a rail 10 in direction 16, about to encounter the division 14 in respective abutting rails 10 and 11.

The condition may be caused by a crack in a rail or a rail in poor condition. The method of inspection dealing with flaw detection, which determines structural defects in track, will distinguish a rail opening or separation if the condition is due to a track in poor condition or by a structural crack in a rail. It may be noted that this condition of separation in the abutting rails disrupts the continuity of the rail surface causing undue wear on the rail vehicle wheels and should the conditiion be bad enough, and overlooked during track inspection, the safety of passengers in the vehicle would be endangered due to the possibility of derailment.

Figure 3:
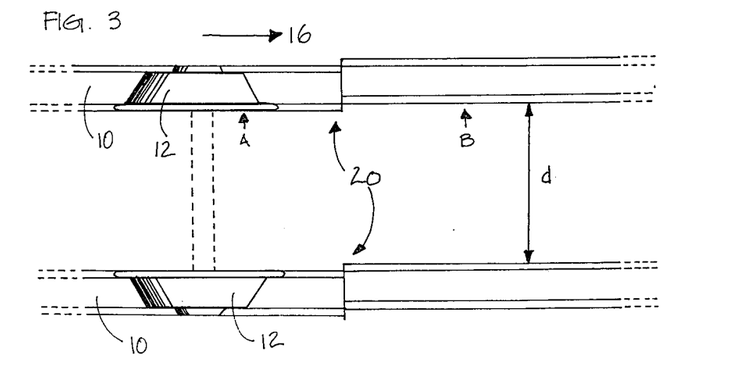
FIG. 3 is a top plan view of a rail-end mismatch condition, in gage.

Another track condition to which attention must be directed is illustrated in FIG. 3 and is known as a rail-end mismatch condition, in gage. In this instance the two seconds of rail 10 are not aligned properly at a respective joint 20. Rail vehicle wheel 12 moves over the rail 10 in a direction 16, encountering the misalignment at joint 20. A rail-end mismatch condition, in gage, can only be detected by a track inspector or if a track geometry measurement sample is taken at the precise location of the mismatch joints. The chance of missing a discontinuity such as this, using one or the other methods of detection, is great. The track geometry sensors measuring gage may take samples at points A and B in FIG. 3, on either side of the mismatched joint. As no value change for distance (d) occurred between the two rails in either sample, no defect or discontinuity would be noted. The rail-end mismatch condition in gage would be overlooked.

Figure 4:
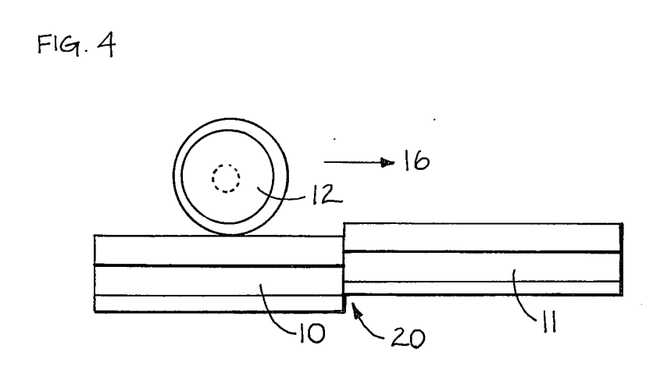
FIG. 4 is a side elevation view of a rail-end mismatch condition, in surface.

The second rail-end mismatch condition occurs in surface. FIG. 4 illustrates a side elevation of rails 10 and 11, in which the two sections of abutting rails 10 and 11 have become misaligned in top surface at joint 20, causing a disruption in the surface continuity. Track geometry measurement will detect a condition such as this resulting from a step at joint 20 in the rail level, but it will not identify the precise location or magnitude of the misaligned joint. The step is detected only because there had been a compared value change in the two levels between measurement samples, not as a result of detection of an actual misalignment in surface continuity.

Figure 5:
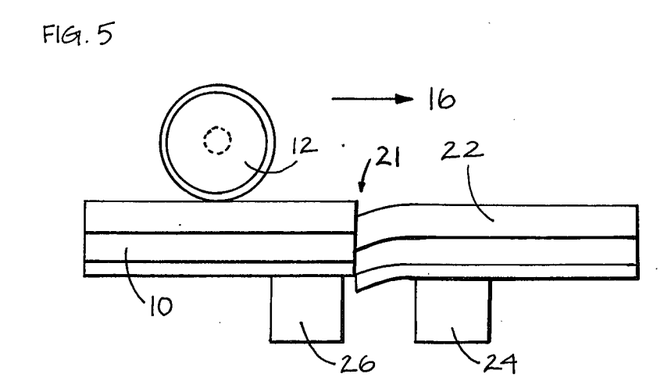
FIG. 5 is a side elevation view of a rail-end batter condition.

FIG. 5 illustrates a rail-end batter condition, occurring in rail 22 as a result of an improperly placed railroad tie 24 which poorly supports rail 22, causing it to deflect at joint 21 as wheel 12 moves along in direction 16 from rail 10, well supported by tie 26, over joint 21 to poorly supported rail 22.

Each of the above-described conditions of rail discontinuity present many problems to high-speed railway vehicles. They may be quite dangerous, perhaps being the cause of railway vehicle derailment. Such conditions also force high-speed railway vehicles to slow, losing time and the efficiency that a well-maintained track should provide.

Figure 6:
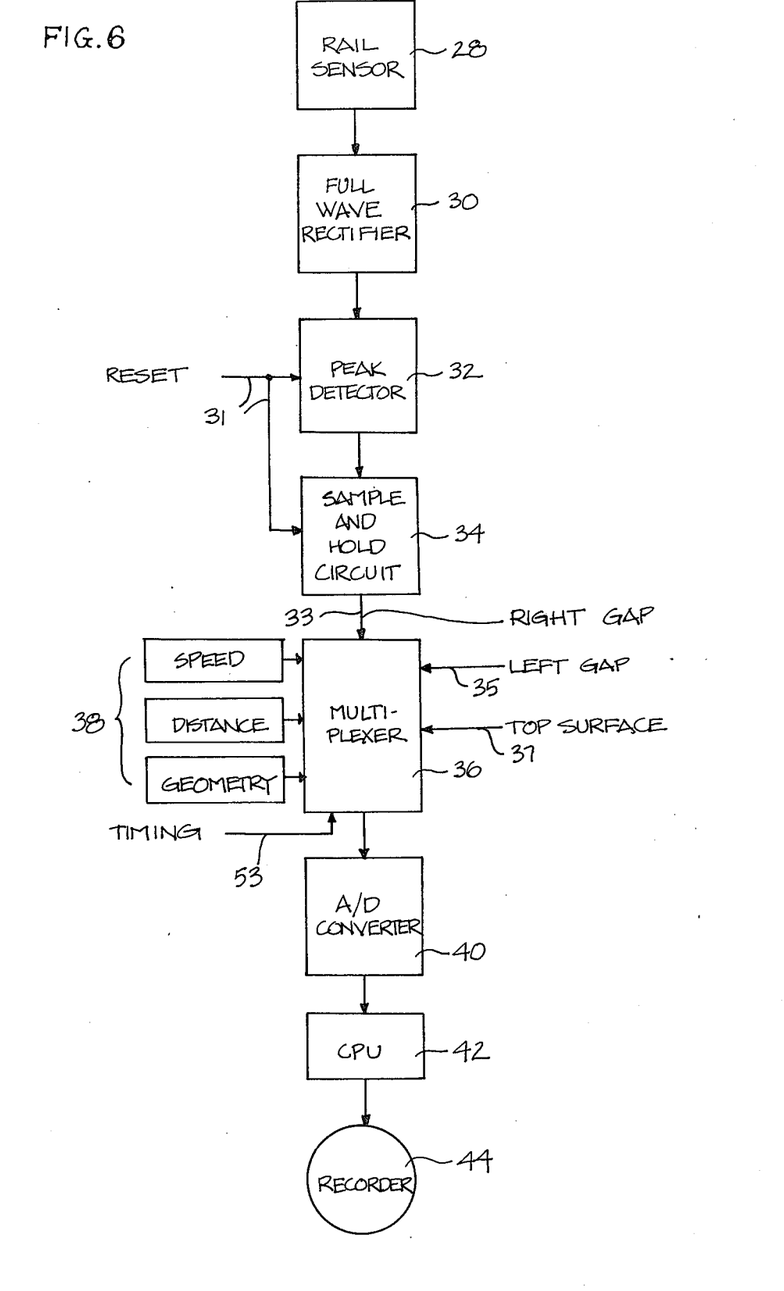
FIG. 6 is a block diagram of the preferred embodiment system in accordance with the invention.

FIG. 6 is a block diagram of a first embodiment of the present invention. Rail sensor 28 may be of any type (capacitive, mechanical, magnetic/servo-magnetic, photo-optical, or laser beam). The invention may employ a mechanical variety similar to those disclosed in U.S. Pat. No. 3,056,209 to R. E. Oliver. Such transducers are well known in the art and need no further explanation.

FIG. 6 illustrates a multiplexer 36 into which several separate channels of information are fed through lines 33, 35, 37 and the group 38. These channels relate to right gap information, left gap information, top surface (right and left) information and location and track geometry data collectively referred to as 38. The right gap information is derived from a rail sensor which scans the gage side surface of a first rail. The left gap relates to information derived from a second sensor that scans the gage side surface of the oppositely disposed rail of a track. The line indicated at 37, is collectively related to right and left top surface information derived from transducers which scan the respective top surfaces of the rails. Each of the channel inputs 33, 35 and 37 are derived from an identical series of components 28, 30, 32 and 34. However, for purposes of convenience, only these components associated with the multiplexer channel input 33 will be explained in detail.

A signal from the rail sensor 28 is fed to a conventional full wave rectifier 30. As the sensor travels down the length of rail, an analog signal will be developed that has various peak portions. The full wave rectifier 30 is employed to make the polarity of the signal, delivered from the rail sensor 28, the same above an average midpoint. Although not shown, it may be necessary to employ a low pass filter between the rail sensor 28 and the rectifier 30 to smooth out noise inherent in the signal from sensor 28.

A conventional peak detector 32 is connected to the output of the full wave rectifier 30. The purpose of the detector is to track the signal from the rectifier and detect the maximum peak reached between sampling intervals. The detector is of conventional design and is reset to a threshold or nominal value, as indicated by reset line 31, at the end of each sample interval. Reset pulses are generated from a central processing unit or computer 42, as will be explained hereinafter, in connection with the timing diagrams of FIG. 7.

The output of the peak detector 32 is fed to a conventional sample and hold circuit 34 which stores the maximum peak, detected by the peak detector 32, for a particular sampling interval. The sample and hold circuit 34 must hold this value for a period that is long enough to permit an analog-to-digital (A/D) converter 40 to digitize the value. The intervening multiplexer 36 acts as a switch between various data input channels. The signal at the output of the sample and hold circuit 34 is indicated on line 33 and is denoted as the previously defined right gap signal. This would constitute a first channel of data flow through the multiplexer 36, to the A/D converter 40. Data flow from the other channels 35 and 37 is sequentially switched through the multiplexer 36, to the A/D converter 40. The channel lines 35 and 37 correspond to the previously defined left gap and top surface signals derived from identical components as 28, 30, 32 and 34.

In order for the present invention to fully service the testing requirements of customers, additional data may be required for processing, relating to the location data parameters of speed and distance as well as track geometry. The apparatus and methods for conducting these measurements is well established in the prior art previously mentioned. From sensors that produce analog signals relating to speed, distance and geometry, additional channels, generally indicated by reference numeral 38 are created. Signals from these channels are sequentially switched through the multiplexer 36, to the A/D converter 49. Thus, in a real time operation of the present invention, the multiplexer 36, under control of the CPU 42 sequentially samples the data signals from channels 33, 35, 37 and those generally indicated by reference numeral 38.

After the signals from the various channels have undergone conversion or digitization through converter 40, the digitized values are transferred to the central processing unit (CPU) or computer, for analysis. The analysis of the various data, collected from the plurality of channel inputs, is achieved by programming the CPU 42 in a manner that does not, per se, form a part of the present invention. Data processing by computers has been well established in the prior art as a means for expediting track condition analysis. A recorder 44 is connected to the output of the CPU 42, in a conventional fashion, to store the processed data from the CPU 42. Although the system shown in FIG. 6 discloses data processing in real time, it is to be understood that the recorder 44, which may be of the tape variety, may be connected to the output of the converter 40, for storing raw data that could be batch processed subsequent to data collection. In such a situation, timing and synchronization for the various components during a sampling interval would have to be performed by timing and synchronization circuits, not shown, as opposed to the creation of such signals from the CPU 42.

Figure 7:
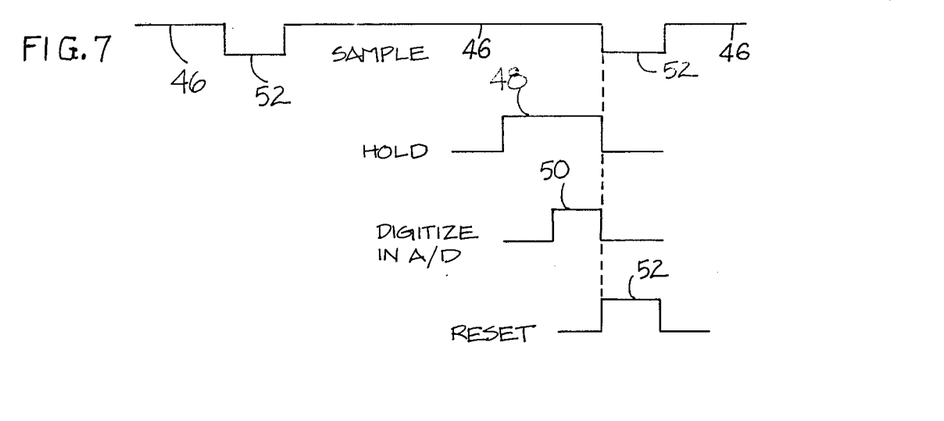
FIG. 7 is a timing diagram of the peak detection, sample and hold process of the invention from FIG. 7.

Reference is made to FIG. 7 which illustrates several timing diagrams relating to the system of FIG. 6. The various timing and synchronization signals shown in FIG. 7 are generated by the CPU 42. The sample interval is indicated by 46 and during this time, the signal from full wave rectifier 30 is fed to peak detector 32 which detects a maximum peak occuring during the sample interval 46. The sample and hold circuit 34 becomes energized during a latter portion of the sample interval 46 and is indicated by 48. During interval 48, the maximum peak detected by the peak detector 32 is stored or held. The hold interval 48 must be of sufficient duration to permit the digitization of the peak value by the A/D converter 40. The digitization interval through the A/D converter 40 is indicated by 50. At the termination of the hold and digitize intervals 48 and 50, respectively, reset pulse is generated by the CPU along line 31. The reset pulse itself is indicated by 52 in FIG. 7 and as will be seen, upon the completion of the reset pulse, a second sample interval comes into being, during which time a second cycle of operation occurs.

The timing diagrams of FIG. 7 are relevant to the various channels of data flow illustrated in FIG. 6, through the multiplexer 36. In order to achieve the sequential sampling of data channel lines to the multiplexer 36, timing signals along line 53 are provided to the multiplexer 36 by the CPU 42, in a conventional fashion.

Summarizing, the system of FIG. 6 provides apparatus that is capable of processing multichannel information regarding track conditions. For example, the multiplexer 36 handles track data relating to train speed, distance and rail geometry, through channel 38, which information is necessary for track condition analysis. Further, additional data channel information is provided along lines 33, 35 and 37. These latter three channels are respectively related to right gap, left gap and top surface track measurements.

Specific details of the undercarriage of the railway vehicles and the placement of each rail sensor have been omitted from the drawings and the present explanation, as they are not considered essential to the understanding of the present invention. As previously stated, the sensors may be of any appropriate type, and the various electrical circuits shown in block form in FIG. 6 are also of conventional design. However, it is the combination of these various components, operating through a multiplexer 36, which provides a novel and unobvious system for the collection of track condition data to an extent, not heretofore made available.

Figure 8:
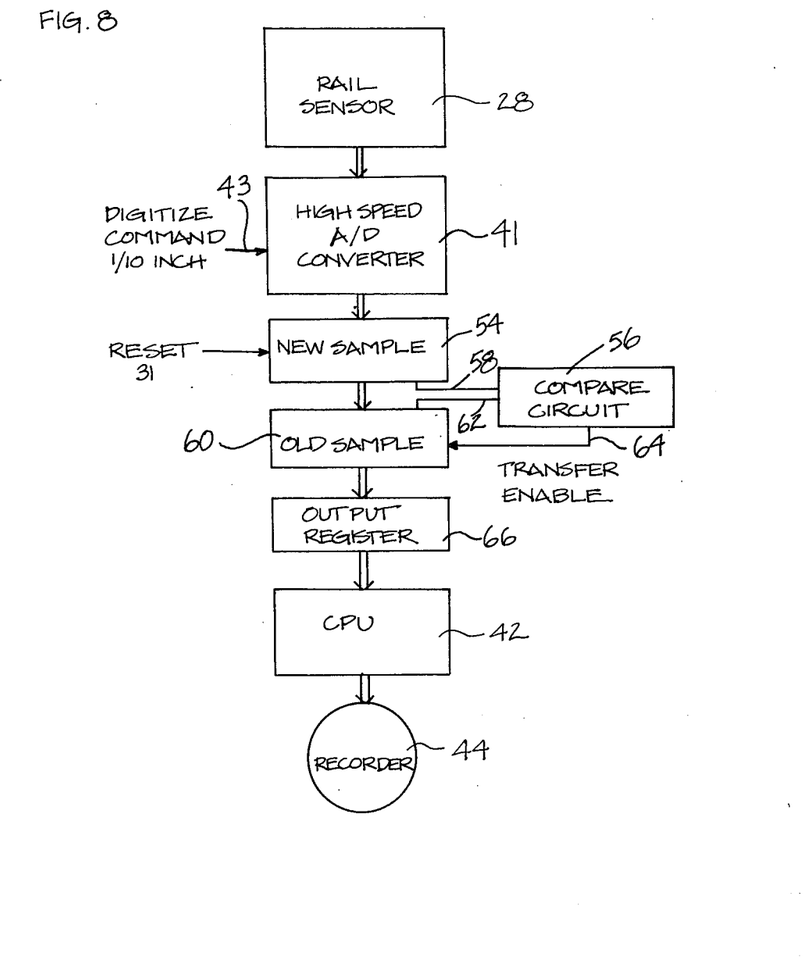
FIG. 8 is a block diagram of a second embodiment of the invention for digitizing data in the area of a rail discontinuity.

Considering the system of FIG. 8, a single channel of data processing is illustrated. It is to be stressed that multiple channels may be processed by the inclusion of a multiplexer as previously explained in connection with FIG. 6. However, for purposes of convenience, a single channel will be shown and explained in connection with FIG. 8.

A rail sensor 28, of the types previously mentioned continuously provides analog data to a conventional high speed A/D converter 41. The data flow from the sensor 28 is converted to a digital format upon the gating of an enabling digitize command such as at 43. Going along with the typical numbers that have been used thus far, a digitize command may appear on line 43 every 1/10 of an inch of track travel such that the system generates 120 samples per foot of track for each channel digitized. The command at line 43 may be generated from an axle pick-up of the type explained in U.S. Pat. No. 3,864,731. During a particular sampling interval, a sensed sample is contained in the old sample register 60. As a new sample is fed from the output of converter 41, it is stored in the new sample register 54. The registers 54 and 60 input to a conventional compare circuit 56 to determine whether the new sample is greater than the old sample. If it is, a transfer enable signal is generated along line 64, from the compare circuit 56, to the old sample data by the new sample data in the register 60. An output register 66 buffers the new sample data to the central processing unit (CPU) 42 for data processing which does not, per se, form a part of the present invention. A recorder 44 may be connected to the output of the CPU 42 to store processed data. The computer generates a reset pulse on line 31, as in the case of the previous embodiment of FIG. 6, to reset a sampling interval.

The previously described embodiments of FIGS. 6 and 8 illustrate systems that are excellent for the detection of discontinuities. However, it would be advantageous to have available a more sophisticated system for the analysis and classification of track problems. Particularly, it would be advantageous to have the capability of visually see and analog discontinuity signal over a 3 to 4 foot span (± 1 ½–2 feet) around a discontinuity. This is referred to as the footprint of a problem area. This can be accomplished by the system shown in FIG. 9. The advantage of the latter-mentioned system is the capability of transferring in time, the waveform of a discontinuity, to a digital computer for automatic analysis and display.

Figure 9:
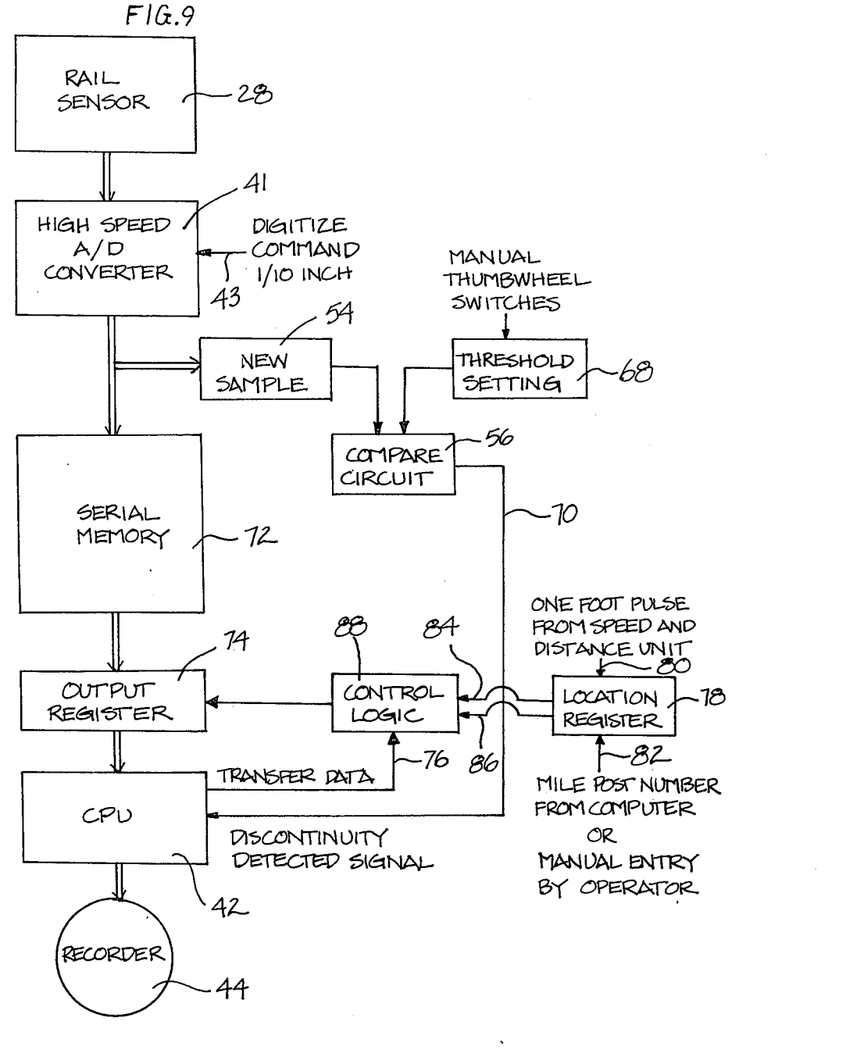
FIG. 9 is an alternate embodiment for digitizing data in the area of a rail discontinuity, utilizing thumbwheel switches for setting discontinuity thresholds.

The embodiment of FIG. 9 is related to the embodiment of FIG. 8 with an improved capability for comparing every sample against a manually set threshold.

A rail sensor 28, of the type having been discussed herein, continually feeds analog data to the previously mentioned converter 41 in response to a digitize command at 43, previously discussed. The output from the converter 41 feeds a new sample register 54 as previously discussed. In lieu of an old sample register (FIG. 8), data is updated by comparing the data in the new sample register 54 with data set by conventional manual thumbwheel switches 68. The comparison is made in the conventional compare circuit 56, previously discussed. Of course, thumbwheel switches 68 may be replaced by a computer generated entry from CPU 42.

In the event the data stored in the new sample register 54 is greater than the threshold setting set by the thumbwheel switches 68, a signal occurs on line 70 thus signalling a detected discontinuity. The data is fed to the CPU 42 for processing, In parallel with the input of the new sample register 54 is a conventional serial memory 72 which feeds data relating to each sample interval to an output register 74. Control logic 88 generates a shift signal to the output register 74 upon the occurrence of an output along transfer data output line 76. The location register 78 receives an input from a speed and distance unit 80, such as the type of instrumentation disclosed in the previously mentioned U.S. Pat. No. 3,864,731, or a milepost detection at input line 82. Milepost detection is conventional in track data recording, as explained in the previously mentioned U.S. Pat. No. 3,864,731. Of course, milepost data may be manually entered by an operator. The purpose of the control logic 88 is to permit the passage of data from the serial memory and data regarding speed, distance and milepost number to the output register 74 which will then transfer this data upon an enable pulse on line 76, to the CPU 42. Thus, discontinuity data as well as location data may be processed by the CPU.

In typical operation of the system shown in FIG. 9, data is taken from the serial memory 72, one word at a time until 3 or 4 feet of data have been transferred from the output register 74 to the CPU 42. The length of data is automatically selectable by a computer program to be up to 6 feet in length. However, as will be appreciated, the numbers used as examples, are merely typical and are not to be considered as limitations of the invention. Data flows through the serial memory 72 at the same rate as the converter 41 is operating. The length of serial memory 72 determines the length of the sample transfer to the CPU 42. When a discontinuity is detected, it is just entering the serial memory 72. Therefore, the control logic 88 times the data transferred to the CPU 42 so that the discontinuity is centered in the data transferred. For example, ± 1 ½ to 2 feet of data around the discontinuity may be transferred. The location register 78 is incremented each time a milepost signal is received or each time a signal is received from a speed and distance unit. This information is important in order to locate the detected discontinuity. The location information is transferred to the CPU 42 along with the discontinuity data from the serial memory 72. The CPU attempts to analyze the data and classify the problem as a particular discontinuity such as rail end mismatch or rail end batter. Although not shown, the CPU may be connected to a printer for producing a printout of the discontinuity waveform, view a high speed printer of conventional design. A message may be printed on the printout to alert a maintenance supervisor that a problem on a track exists.

It should be understood that the invention is not limited to the exact details of construction shown and described herein for obvious modifications will occur to persons skilled in the art.

I claim as my invention:

1. A system for detecting rail discontinuities comprising:
    I. at least one data channel having;

a. means for sensing a preselected type of rail discontinuity and generating an electrical signal indicative thereof;
b. means connected to an output of the sensing means for converting the signal from an analog form to a digital form;
C. storage means connected to an output of the converting means for storing data relating to a new sample interval;
d. register means connected in circuit with the output of the converting means for storing data relating to a new sample interval;
e. means for establishing a threshold level;
f. means connected to the output of the register means and the threshold means for comparing the contents of both; and
II. connecting means responsive to a preselected comparison by the comparing means for enabling the transfer of the new sample data from the storage means to a central processing unit.

2. The subject matter set forth in claim 1 together with another register means for storing data relative to discontinuity position, and means responsive to the transfer of the new sample data to the central processing unit, for enabling the additional transfer of corresponding position data to the central processing unit.

* * * * *